United States Patent [19]

Stratmann et al.

[11] Patent Number: 4,460,614
[45] Date of Patent: Jul. 17, 1984

[54] FAT BLEND USEFUL FOR PRODUCING BUTTER-LIKE SPREADS

[75] Inventors: Wilhelm Stratmann, Weinheim, Fed. Rep. of Germany; Paul F. Legge, Wirral, England

[73] Assignee: Lever Brothers Company, New York, N.Y.

[21] Appl. No.: 414,721

[22] Filed: Sep. 3, 1982

[30] Foreign Application Priority Data

Sep. 3, 1981 [GB] United Kingdom ............... 8126747

[51] Int. Cl.³ ..................... A23D 3/00; A23D 5/00
[52] U.S. Cl. ............................ 426/603; 426/607; 426/608
[58] Field of Search ............... 426/603, 604, 607, 608

[56] References Cited

U.S. PATENT DOCUMENTS

| | | | |
|---|---|---|---|
| 2,921,855 | 1/1960 | Melnick et al. | 426/603 |
| 4,049,839 | 9/1977 | Luddy et al. | 426/607 |
| 4,205,006 | 5/1980 | Luddy et al. | 426/607 X |

FOREIGN PATENT DOCUMENTS

| | | | |
|---|---|---|---|
| 593336 | 2/1960 | Canada | 426/607 |
| 718373 | 9/1965 | Canada | 426/604 |
| 718372 | 9/1965 | Canada | 426/604 |

*Primary Examiner*—Robert A. Yoncoskie
*Attorney, Agent, or Firm*—Amirali Y. Haidri; James J. Farrell

[57] ABSTRACT

The present invention relates to a fat blend useful for producing butter-like spreads. The fat blend comprises (i) a non-interesterified component based on tallow fat or a fraction thereof, and (ii) a mixture of triglycerides obtained by interesterification of tallow fat or a fraction thereof with a liquid oil or a mixture of a liquid oil and a hydrogenated oil.

8 Claims, No Drawings

FAT BLEND USEFUL FOR PRODUCING BUTTER-LIKE SPREADS

The present invention relates to fat blends useful for producing butter-like spreads; particularly spreads of the margarine type.

The present invention relates further to a process for producing spreads having butter-like properties.

Products having butter-like properties have an elasticity, a plasticity and a melting behaviour comparable to those of natural butter.

References relating to these properties and their measurements are for instance J. Dairy Res. 8, 245 (1937, Davies J. C. and the British Food Manuf. Ind. Res. Inst. the Rheology of Margarine and Compound Cooking fats, Part I (Res. Rep. 37) and Part II (Res. Rep. 69), 1956, Prentice J. H.

In view of the highly desirable and appreciated properties of natural butter, several attempts have been made to produce a cheaper substitute which displays said properties.

The products obtained sofar are not fully satisfactory and their production costs are often prohibitive.

Applicants have found a specific blend and a process which meet the above requirements.

The fat blend according to the invention comprises: a non-interesterified component (i) essentially consisting of tallow and/or a fraction thereof and an interesterified component (ii) essentially consisting of a mixture of triglycerides obtained by interesterification of tallow and/or a fraction thereof with a liquid oil and/or a hydrogenated oil.

The tallow originates preferably from beef or mutton. The tallow fractions can be obtained by fractionation of tallow in the presence of a solvent (wet fractionation), in the absence of a solvent (dry fractionation) or in the presence of a detergent (Lanza fractionation). The dry fractionation is the simplest, the most economic and therefore the preferred method.

To obtain tallow fractions useful for producing fat blends according to the invention, dry fractionation is carried out at a temperature ranging from 30°–36° C., preferably at 31°–33° C. Fractionation can be carried out by heating tallow until it becomes liquid and preferably to a temperature of about 60° C., cooling the tallow, preferably in 2 stages, first to 40°–43° C. and keeping it at this temperature for preferably 10–14 hours and then further cooling it to the fractionation temperature which is ideally 32° C. The separation of the higher melting stearin from the lower melting olein can be carried out in a way known per se, e.g. on a rotating drum fitted with scraper blades. The tallow olein is subsequently neutralized, bleached and deodorized to obtain a refined product containing preferably less than 0.3% free fatty acids. The fat solids profile of the tallow olein used in the present invention preferably has the following fat solids profile $N_{10}=45–60$; $N_{20}=15–25$; $N_{30} \leq 7$; $N_{35} \leq 4$ and a slip-melting point from 29°–34° C.

The percentage of solid fat is measured by nuclear magnetic resonance analysis according to J.A.O.C.S. 1971 (48) p. 7 A. J. Haighton et al.) after stabilization during a period of 10–16 hours at 0° C.

The properties of a typical tallow olein fraction used in the process of the present invention are summarized in Table A.

Component (ii) in the fat blend according to the invention is obtained by interesterifying, particularly by randomly interesterifying the tallow based fat with the oil at 25°–175° C., preferably at 80°–140° C. using about 0.01–0.5 wt. % of a catalyst such as an alkali metal, an alkali metal hydroxide, -alkoxide, under substantially moisture-free conditions and under subatmospheric pressures.

The liquid oil used for producing component (ii) is preferably an oil which does not contain solid fat at 15° C. and consists preferably of sunflower oil, cottonseed oil, rapeseed oil, soybean oil, maize oil, groundnut oil or mixtures thereof.

It is however also possible to use a mixture of a liquid oil and a hydrogenated oil, preferably having a melting point not exceeding about 43° C.

The ratio of components (i) and (ii) should be such that the solids fat profile of the final blend is preferably as follows:

$$N_{10}=34–60; N_{20}=10–25; N_{35} \leq 7; N_{35} \leq 2.$$

The ratio of component (i): component (ii) ranges generally from 75:25 to 25:75.

The ratio of the tallow based fat to the oil in the mixture to be interesterified ranges from 75:25 to 25:75 preferably from 60:40 to 40:60.

If the proportion of liquid oil is too high, this will result in a product having a less steep dilatation line, which will be reflected in a product having an unsatisfactory coolness. If on the other hand the proportion of liquid oil is too low this will result in a product having too high a level of fat solids at the temperature prevailing in the mouth.

It is therefore recommended that component (ii) of the fat blend have a fat solids level at 35° C. which is lower than 3 and preferably lower than 2.

The preferred fat blends according to the invention comprise 40–75% by weight of tallow olein and 60–25% by weight of a mixture of triglycerides obtained by random interesterification of 55–75% by weight tallow olein with 25–45% by weight liquid oil.

It is also possible to substitute a minor proportion of tallow for part of the olein in the non-interesterified component (i) of the fat blends according to the invention. Preferably the ratio of tallow olein to tallow in component (i) should exceed 3:1 and preferably exceed 4:1 in order to ensure that the organoleptic properties of the final product are not substantially affected by higher melting triglycerides present in tallow.

Suitable blends according to the invention may comprise from 90 to 100% of components (i) and (ii) as defined above and from 0 to 10% of another fat, provided that this does not affect the fat solids profile of the final product, which should remain within the ranges defined above.

The w/o emulsions according to the invention are produced by emulsifying the aqueous phase (about 16 wt. %) in the fat phase and applying, cooling and working to crystallize the fat and obtain a product having the desired texture and plasticity. Cooling and working are usually carried out, using e.g. a Votator sequence comprising A-units, C-units and B-units. A-units are surface scraped heat-exchangers in which the emulsion is rapidly cooled to 5°–10° C. In C-units the emulsion is allowed to crystallize in a gently stirred, uncooled crystallizer. In B-units (resting tubes) further crystallization is allowed to take place. These units are generally preceded by A-units, in which the emulsion is cooled to a rather low temperature, to obtain a packageable product.

Applicants have found that it was particularly useful to ensure that the w/o emulsions are packaged and stored at a temperature not exceeding 10° C., and ideally not exceeding 5° C., since at these temperatures problems associated with development of graininess can be considerably reduced.

Graininess is due to the formation of perceivable fat crystal conglomerates, which in some instances result in products having unacceptable organoleptic properties.

The invention will now be illustrated in the following Examples:

EXAMPLE 1

A margarine was produced, starting from an aqueous phase (16 wt. %), pH 5.6, comprising water, soured, skimmed milk, and salt. This aqueous phase was emulsified in a molten fatty phase (84 wt. %) comprising:

an emulsifier system consisting of lecithin and a monoglyceride;

minor ingredients, such as vitamins, colour and antioxidants; and a fat blend consisting of
 (i) 60% of a tallow olein obtained by dry fractionation of a tallow at 32° C.;
 (ii) 40% of a product obtained by random interesterification of a mixture of 70% of the tallow olein described above and 30% of sunflower oil.

Components (i) and (ii) were previously dried to a water content of 0.01%. Interesterification was carried out at 90° C. under a pressure of 2 cm mercury in the presence of sodium methoxide, the emulsifier system and the minor ingredients stated above.

The emulsion was fed to Votator A-, B- and C-units.

The emulsion emerging from the resting tube B was packaged at a temperature between 5° and 10° C. The margarine was stored and transported at 5° C. Table A illustrates
 (i) the solids profile and the melting point of the olein fraction used, the total fat blend and the fat mixture before and after interesterification;
 (ii) the fatty acid composition of the olein fraction and of the total composition.

The margarine was subjected to a panel of experts, who tested the product for graininess. The margarine had not developed a perceivable graininess. Microscopic examination of the product did not reveal graininess.

The hardness (expressed in C-values g/cm$^2$) of the margine was measured and compared with the values obtained with natural butter. The results are summarized in Table B.

TABLE A

|  |  | Tallow olein | Composition* | Before and After interesterification | |
|---|---|---|---|---|---|
| Solids [%] | 10° C. | 53.7 | 49.7 | 33.1 | 36.4 |
|  | 15° C. | 38.8 | 35.0 | 22.4 | 23.5 |
|  | 20° C. | 18.8 | 18.7 | 10.3 | 13.7 |
|  | 25° C. | 8.7 | 9.3 | 4.3 | 8.5 |
|  | 30° C. | 3.1 | 4.2 | 1.8 | 4.7 |
|  | 35° C. | 0.8 | 1.2 | 0.1 | 2.7 |
| m.p. | °C. | 30.5 | 32.5 | 29 | 35.5 |
| Fatty acids [%] | $C_{12}$ | 0.1 | 0.5 |  |  |
|  | $C_{14}$ | 3.0 | 2.4 |  |  |
|  | $C_{15}$ | 0.9 | 0.7 |  |  |
|  | $C_{16}$ | 22.8 | 20.0 |  |  |
|  | $C_{16:1}$ | 5.0 | 3.8 |  |  |
|  | $C_{17}$ | 1.1 | 0.9 |  |  |

TABLE A-continued

|  | Tallow olein | Composition* | Before and After interesterification | |
|---|---|---|---|---|
| $C_{18}$ | 17.0 | 15.5 |  |  |
| $C_{18:1}$ | 40.1 | 39.1 |  |  |
| $C_{18:2}$ | 4.4 | 12.7 |  |  |
| $C_{18:3}$ | 1.4 | 1.5 |  |  |
| $C_{20}$ |  |  |  |  |

*Composition: 60% of olein obtained by dry fractiona- of tallow at 32° C. and 40% of an interesterified mixture obtained by random interesterification of a mixture consisting of 70% of the above olein and 30% of sunflower oil.

TABLE B

|  | C-values at 5° C. | | | Plasticity at 5° C. | | |
|---|---|---|---|---|---|---|
|  | 1 week | 4 weeks | 10 weeks | 1 week | 4 weeks | 10 weeks |
| Margarine | 2570 | 3720 | 3660 | 2–3 | 2–3 | 3 |
| Butter | 2530 | 3470 | 3000 | 2 | 2 | 2 |

Score = 1 is very plastic
Score = 6 is not plastic

The members of the panel expressed as their opinion that the margarine had excellent butterlike properties.

The plasticity was determined applying a test involving the use of a metal rod which is pushed into the product, resulting in a collar formation. A product having good butterlike properties does not display collar formation.

COMPARATIVE EXPERIMENTS

The following experiments are intended to show the importance of the use of the interesterified component in the fat blends of the present invention.

Three margarines X, Y and Z were produced and compared with natural butter. The methods of preparation were substantially the same as illustrated in Example 1, except that the fat blend was varied. The fat blend X consisted exclusively of the tallow olein fraction. The fat blend Y consisted for 90% of the tallow olein and for 10% of groundnut oil.

The fat blend Z consisted for 75% of the tallow olein described in Example 1 and for 25% of an interesterified mixture (75/25) of the tallow olein and groundnut oil.

The results are summarized in the following Table C.

TABLE C

|  | C-values at 5° C. | | | Plasticity at 5° C. | | |
|---|---|---|---|---|---|---|
|  | 1 week | 4 weeks | 10 weeks | 1 week | 4 weeks | 10 weeks |
| X | 1800 | 3000 | 3030 | 2 | 3 | 3 |
| Y | 2670 | 2850 | 2400 | 5 | 5 | 4/5 |
| Z | 2500 | 2870 | 2570 | 3 | 3 | 3 |
| Butter | 1750 | 2180 | 1970 | 2 | 2 | 2 |

After 1 week, at 5° C., the C-value of margarine X was at the same level as that of butter. However, on storage this margarine displayed post-hardening.

The plasticity of margarine Y deviated too much from that of butter.

Margarine Z (according to the invention) had a plasticity and a hardness profile comparable to those of butter.

EXAMPLE 2-5

Fat blends were produced having the following compositions.

EXAMPLE 2

35% of the dry fractionated tallow olein of Example (1);
65% of a randomly interesterified mixture obtained by interesterification of a mixture consisting of 40% edible tallow and 60% soybean oil.

EXAMPLE 3

40% of the dry fractionated tallow olein of Example 1 and 60% of a randomly interesterified mixture obtained by interesterification of a mixture consisting of 40% edible tallow and 60% soybean oil.

EXAMPLE 4

40% of the dry fractionated tallow olein of Example 1;
5% edible tallow; and
55% of a randomly interesterified mixture obtained by interesterification of a mixture consisting of 40% edible tallow and 60% soybean oil.

EXAMPLE 5

40% of the dry fractionated tallow olein of Example 1;
10% edible tallow; and
50% of a randomly interesterified mixture obtained by interesterification of a mixture consisting of 40% edible tallow and 60% soybean oil.
The fat solids profile is given in Table D.

TABLE D

| Solids | Ex. 2 | Ex. 3 | Ex. 4 | Ex. 5 |
|---|---|---|---|---|
| $N_{10}$ | 34.9 | 36.9 | 42.1 | 43.3 |
| $N_{15}$ | 21.9 | 24.4 | 28.7 | 30.2 |
| $N_{20}$ | 10.4 | 11.1 | 14.9 | 16.3 |
| $N_{25}$ | 4.7 | 4.8 | 8.2 | 7.9 |
| $N_{30}$ | 3.1 | 2.3 | 3.8 | 4.3 |
| $N_{35}$ | 1.0 | 0.5 | 1.7 | 2.0 |
| M.p. | 32.5 | 32.5 | 33.5 | 34.5 |
| Collar test/ plasticity | 3 | 3 | 2 | 4 |

Margarines were produced according to Example 1 and their butter-like properties were measured. The products were assessed with respect to collar formation and organoleptic properties. The scores were comparable to those obtained in Example 1.

EXAMPLE 6

A fat blend was produced having the following composition:
60% of the dry fractionated olein obtained according to Example 1;
40% of an interesterified mixture obtained by random esterification of 43% edible tallow, 10% soybean oil hydrogenated to m.p. 36° C., 17% soybean oil and 30% rapeseed oil.
The fat solids profile was as follows:

$N_{10}=47,5$; $N_{20}=16.7$; $N_{30}=2.8$; $N_{35}=0.1$.

Margarines were produced from that blend according to the procedure outlined in Example 1 and their butter-like properties were measured. The products were assessed with respect to collar formation and organoleptic properties. The scores were comparable to those of the product of Example 1.

EXAMPLE 7

A fat blend was produced from
70% dry fractionated olein (see Example 1);
30% of an interesterified mixture obtained by random interesterification of a mixture of 50% sunflower oil and 50% tallow stearin which is the higher melting fraction, i.e. the by-product of the dry fractionation of tallow at 32° C. The fat solids profile of the tallow stearin was as follows:

$N_{10}=79.8$; $N_{20}=71.7$; $N_{30}=55.6$; $N_{35}=47.4$

The fat solids profile of the fat blend was as follows:

$N_{10}=50.1$; $N_{20}=19.3$; $N_{30}=4.6$; $N_{35}=1.0$.

The C-value at 5° C. was about 3300 g/cm².

Margarines were produced from that blend according to the procedure outlined in Example 1 and their butter-like properties were measured. The products were assessed with respect to collar formation and organoleptic properties. The scores were comparable to those of the product of Example 1.

The margarines of all examples were packaged and stored at 5° C. All margarines were tested microscopically on graininess development. None of the samples displayed graininess.

We claim:

1. A butter-like fat blend comprising a non-interesterified component (i) consisting essentially of tallow, a tallow olein, a tallow stearin or a mixture of said fats and an interesterified component (ii) consisting of a mixture of triglycerides obtained by interesterification of tallow, tallow olein, tallow stearin or a mixture thereof with a liquid oil or with a mixture of a liquid oil and an oil hydrogenated to a melting point not exceeding 43° C., wherein the ration of non-interesterified to interesterified component ranges from 75:25 to 25:75 and the ratio of tallow fat to oil in the interesterified mixture ranges from 75:25 to 25:75 and said fat blend displays the following fat solids profile:

$N_{10° C.}=34–60$; $N_{20° C.}=10–25$; $N_{30° C.}\leq 7$; $N_{35° C.}\leq 2$.

2. A fat blend according to claim 1, wherein the liquid oil and/or the hydrogenated oil are selected from the group consisting of sunflower-, soybean-, safflower-, groundnut-, maize-, cottonseed- and rapeseed oil.

3. A fat blend according to claim 1, wherein the tallow olein displays the following fat solids profile:

$N_{10}=45–60$; $N_{20}=15–25$; $N_{30}\leq 7$; $N_{35}\leq 4$.

4. A fat blend according to claim 1, in which component (i) consists of a mixture of tallow olein and tallow in a ratio higher than 3:1.

5. A fat blend according to claim 1, in which the tallow fat in both components (i) and (ii) consists of tallow olein.

6. A fat blend according to claim 5, comprising 40–75% by weight of tallow olein and 60–25% by weight of a mixture of triglycerides obtained by interesterification of 55–75% by weight of tallow olein with 25–45% by weight of liquid oil.

7. A fat blend according to claim 1, comprising 90–100% by weight of components (i) and (ii), and 0–10 wt. % of a fat other than components (i) and (ii), provided that the fat solids profile remains within the following profile:

$N_{10}=34–60$; $N_{20}=10–25$; $N_{30}\leq 7$; $N_{35}\leq 2$.

8. A process for producing a spread having butter-like properties which comprises:
 (a) emulsifying an aqueous phase with a fat blend according to claim 1;
 (b) mechanically working the emulsion and cooling it to obtain a spread having the desired texture and consistency; and
 (c) packaging and storing the emulsion at a temperature not exceeding 10° C.

* * * * *